United States Patent [19]

Miyashita

[11] Patent Number: 5,171,871

[45] Date of Patent: Dec. 15, 1992

[54] PROCESS FOR POLYMERIZING AN AROMATIC VINYL COMPOUND AND A CATALYST THEREFOR

[75] Inventor: Akira Miyashita, Ageo, Japan

[73] Assignee: Tosoh Corporation, Shinnanyo, Japan

[21] Appl. No.: 843,242

[22] Filed: Feb. 28, 1992

[30] Foreign Application Priority Data

Mar. 1, 1991 [JP] Japan .................. 3-57596

[51] Int. Cl.$^5$ .................................. C07F 7/28
[52] U.S. Cl. .................................. 556/27; 502/104; 526/160
[58] Field of Search .................. 556/27; 526/160; 502/104

[56] References Cited

U.S. PATENT DOCUMENTS 4,808,680 2/1989 Schmidt et al. .
5,045,517 9/1991 Campbell, Jr. et al. ............ 526/160

FOREIGN PATENT DOCUMENTS 0447880 9/1991 European Pat. Off. .

Primary Examiner—Joseph L. Schofer
Assistant Examiner—David Wu
Attorney, Agent, or Firm—Oblon, Spivak, McClelland, Maier & Neustadt

[57] ABSTRACT

A catalyst for polymerizing an aromatic vinyl compound, having the formula (I):

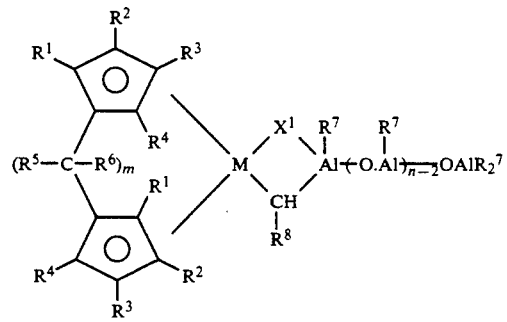

where M is an element of Group IVa; $X^1$ is a halogen; $R^1$, $R^2$, $R^3$, $R^4$, $R^5$, $R^6$ and $R^7$ are independently hydrogen or an alkyl group having 1 to 6 carbon atoms; $R^8$ is hydrogen or an alkyl group having 1 to 5 carbon atoms; m is an integer of from 1 to 6; and n is an integer of from 4 to 60. The vinyl polymer produced has predominantly a syndiotactic structure.

6 Claims, No Drawings

PROCESS FOR POLYMERIZING AN AROMATIC VINYL COMPOUND AND A CATALYST THEREFOR

BACKGROUND OF THE INVENTION

1. Field of the Invention

The present invention relates to a process for polymerizing an aromatic vinyl compound, and a catalyst therefore. More particularly, the present invention relates to a process for producing a polymer of an aromatic vinyl compound, mainly in a syndiotactic configuration with high selectivity, and a catalyst therefore.

2. Description of the Background

Aromatic vinyl polymers are classified into three types according to the steric configuration thereof: namely, syndiotactic polymers, isotactic polymers, and atactic polymers. Of these three types of polymers, the syndiotactic polymers are useful as heat-resistant polymers owing to their higher melting points and lower crystallization rates in comparison with other types of polymers. The syndiotactic aromatic vinyl polymers are produced, for example, with a catalyst formed by contact of a titanium compound, such as a titanium halide and an alkoxy titanium, with an organic aluminum compound and a condensing agent as described in Japanese Laid-Open Patent Application Sho 62-104818.

Conventional processes, such as are represented by Japanese patent application Hei 2-53711, have the disadvantage that the formed syndiotactic aromatic vinyl polymer inevitably contains an atactic polymer as a by-product.

Thus, a need exists for a process by which a syndiotactic aromatic vinyl polymer can be produced with a high degree of selectivity.

SUMMARY OF THE INVENTION

Accordingly, it is an object of the present invention to provide a process for polymerizing an aromatic vinyl compound into a polymer predominantly having a syndiotactic configuration with a high degree of selectivity.

It is also an object of the present invention to provide a catalyst for effecting the above process.

These objects and others which will become more apparent in view of the following disclosure are provided by a catalyst for polymerizing an aromatic vinyl compound, the catalyst having the formula (I):

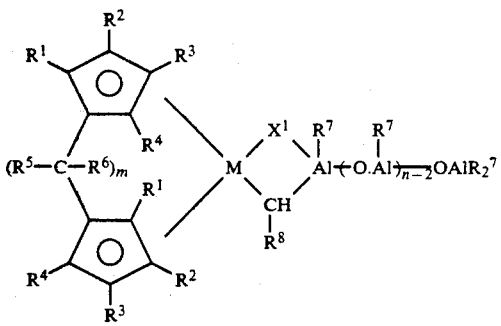

where M is an element of Group IVa; $X^1$ is a halogen; $R^1$, $R^2$, $R^3$, $R^4$, $R^5$, $R^6$ and $R^7$ are independently hydrogen or an alkyl group having 1 to 6 carbon atoms; $R^8$ is hydrogen or an alkyl group having 1 to 5 carbon atoms; m is an integer of from 1 to 6; and n is an integer of from 4 to 60.

DETAILED DESCRIPTION OF THE PREFERRED EMBODIMENTS

The present invention is predicated upon the discovery that a syndiotactic aromatic vinyl polymer can be produced with a high degree of selectivity by using a catalyst obtained by isolating the reaction product of a compound of a transition metal of Group IVa with an alumoxane.

Thus, the present invention provides a catalyst and a process for polymerizing an aromatic vinyl compound into a polymer predominantly of a syndiotactic configuration with a high degree of selectivity.

The catalyst for polymerizing aromatic vinyl compound according t the present invention is represented by the formula (I):

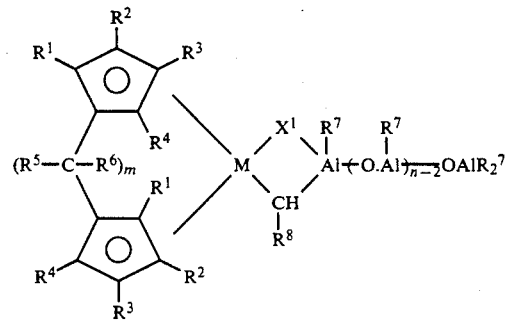

where M is an element of Group IVa; $X^1$ is a halogen; $R^1$, $R^2$, $R^3$, $R^4$, $R^5$, $R^6$ and $R^7$ are independently hydrogen or an alkyl group having 1 to 6 carbon atoms; $R^8$ is hydrogen or an alkyl group to 5 carbon atoms; m is an integer of from 1 to 6; and n is an integer of from 4 to 60.

The process for producing the aromatic vinyl polymer according to the present invention uses the above catalyst.

The transition metal compound represented by the formula (II) below is used to prepare the catalyst of the present invention of polymerizing the aromatic vinyl compound.

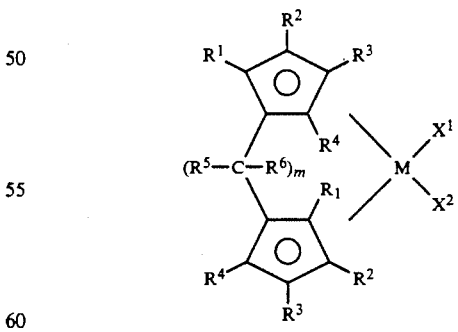

where M is an element of Group IVa; $X^1$ and $X^2$ are, respectively, each independently a halogen; $R^1$, $R^2$, $R^3$, $R^4$, $R^5$ and $R^6$ are independently hydrogen or an alkyl group having 1 to 6 carbon atoms; and m is an integer of from 1 to 5.

In the formulas (I) and (II), the transition metal (M) is an element of Group IVa of the Periodic Table, including titanium, zirconium, and hafnium. Of these transition metals, titanium is preferred.

$X^1$ and $X^2$ are respectively a halogen atom, preferably chlorine.

The substituents of $R^1$ to $R^6$, which are an alkyl group of 1 to 6 carbons, include linear and branched alkyl groups such as methyl, ethyl, propyl, n-butyl, isobutyl, tert-butyl, n-pentyl, isopentyl, n-hexyl, and isohexyl, for example.

In formula (I), $R^7$ is hydrogen or an alkyl group of 1 to 6 carbon atoms, such as are defined generally and preferably for groups $R^1$ to $R^6$.

The size (m) of the linking group for linking the two cyclopentadienyl rings is in the range of from 1 to 6, preferably from 1 to 2.

In formula (I), $R^8$ is hydrogen or an alkyl group having 1 to 5 carbon atoms, such as methyl, ethyl, n-propyl, isopropyl, n-butyl, isobutyl, tert-butyl, n-pentyl, and isopentyl, for example. However, as an alkyl group, methyl is preferred.

Specific examples of the catalyst component include, for example methylenebis(cyclopentadienyl)titanium dichloride, and ethylenebis(2,3,4,5-tetramethylcyclopentadienyl)titanium dichloride.

The other component for synthesizing the catalyst for the aromatic vinyl compound polymerization is an alumoxane. The substituents on the aluminum of the alumoxane include alkyl groups of 1 to 6 carbons such as methyl, ethyl, propyl, and butyl, for example, of which groups methyl is preferred. The oligomerization degree (n) is in the range of from 4 to 60. Such compounds are produced according to known methods: for example, by adding an aluminum compound into a suspension of a crystal-water-containing compound or a crystal-water-containing salt (e.g., copper sulfate hydrate, aluminum sulfate hydrate, etc.) in a hydrocarbon medium to cause reaction.

In the synthesis of the catalyst for polymerizing the aromatic vinyl compound, the ratio of the transition metal compound to the alumoxane is in the range of from 1 to 10 in terms of a molar ratio.

The reaction product, after the reaction is conducted under the aforementioned reaction conditions, can be isolated without impurity by separation from the excess of alumoxane and purification by recrystallization or other isolation methods. In the obtained complex, the atomic ratio of the aluminum to the transition metal is equal to the oligomerization degree of the alumoxane. This is confirmed by determining the amount of methane evolved by decomposition of the complex. Further, the structure of the complex was confirmed to be represented by the general formula (I) according to H-NMR measurement.

The aromatic vinyl compounds to be polymerized according to the present invention are styrene and derivatives thereof. The styrene derivatives include alkylstyrenes such as methylstyrene, ethylstyrene, and dimethylstyrene; halogenated styrenes such as chlorostyrene, bromostyrene, and fluorostyrene; halogen-substituted alkylstyrenes such as chloromethylstyrene; alkoxystyrenes such as methoxystyrene; carboxymethylstyrene, alkyl ether styrene, and alkylsilylstyrenes, for example.

In the present invention, an aromatic vinyl compound is polymerized in the presence of the above-mentioned catalyst. In the polymerization, alumoxane may be added as a second component, by which the catalyst activity will be improved. The polymerization may be conducted in bulk, or in a solution in an aliphatic hydrocarbon such as pentane, hexane, and heptane, for example; an alicyclic hydrocarbon such as cyclohexane, for example; or an aromatic hydrocarbon such as benzene, toluene, and xylene, for example.

The concentration of the catalyst is not specially limited, but is preferably in the range of from 0.1 to 1000 mmol/l. The polymerization temperature is not limited, but is preferably in the range of from $-70$ to $150°$ C.

The present invention is described in more detail by reference to Examples without limiting the invention in any way.

EXAMPLE 1

Synthesis of Complex:
Methylenebis(cyclopentadienyl)-titanium-methylalumoxane (tetramer)

In a nitrogen-purged Schlenk reaction vessel, 97.4 mg (0.37 mmol) of dichloromethylenebis(cyclopentadienyl)titanium was weighted out. Thereto 20 ml of dried toluene was added, and the mixture was cooled to $-20°$ C. A solution of 1.4 mmol of methylalumoxane (tetramer) in benzene was added thereto dropwise with stirring over one hour. The reaction solution was gradually brought to room temperature, and then stirred continuously for 2 days. The reaction solution changed gradually its color from violet to reddish brown. Hexane was added thereto, and the formed precipitate was collected by filtration, dried and recrystallized. The yield was 82%.

The methane evolved by hydrolysis of the resulting complex was determined by gas chromatography. The quantity of the methane corresponds to 98% of the calculated quantity by assuming that the structure of the complex is represented by the general formula (I). The identification by H-NMR was as below:

0.34 ppm (s, terminal Al-Me Ti-$CH_2$-Al-Me)
0.97 ppm (m, O-Al(Me)-O)
1 31 ppm (m, O-Al(Me)-O)
3.56 ppm (s, $C_5H_4$-$CH_2$-$C_5H_4$)
4.9 ppm (t, $C_5H_4$)
5.3 ppm (t, $C_5H_4$)
6.67 ppm (s, Ti-$CH_2$-Al)

EXAMPLE 2

In a nitrogen-purged Schlenk type reactor, 20 mg (0.041 mmol) of the complex synthesized in Example 1 was weighed out, and thereto 10 ml of toluene was added. Further thereto, 3.0 ml of styrene was added, and the styrene was polymerized at room temperature for 10 hours.

After the polymerization reaction, 0.5 ml of methanol was added to stop the reaction. The reaction product was poured into a mixture of 200 ml of methanol and 2 ml of hydrochloric acid, and stirred sufficiently. The formed white polymer was collected by filtration, and washed twice with 50 ml of methanol. The yield of the dried polymer was 0.114 g.

This polymer was extracted with methyl ethyl ketone for 12 hours by means of a Soxhlet extractor. As the result, no methyl ethyl ketone-soluble portion was found.

The molecular weight of the resulting polymer was 65,000 in weight average by gel permeation chromatography (GPC). The melting point thereof was 267° C. according to differential scanning calorimetry (DSC). The structure of the polymer was analyzed by $^{13}$C-

NMR in o-dichlorobenzene, and the pentad rrrr was calculated to be not less than 99% on the basis of the peak of 145.5 ppm originating from the syndiotactic configuration.

COMPARATIVE EXAMPLE 1

Synthesis of Complex: Bis(cyclopentadienyl)titanium-methylalumoxane (tetramer)

The synthesis was conducted in the same manner as in Example 1 except that bis(cyclopentadienyl)titanium was used in place of the methylenebis(cyclopentadienyl)titanium of Example 1. The intended product was obtained in a yield of 62%.

COMPARATIVE EXAMPLE 2

Styrene was polymerized in the same manner as in Example 2 except that the complex used was the one synthesized in Comparative Example 1. Thereby 0.02 g of the polymer was obtained. This polymer was extracted with methyl ethyl ketone for 12 hours by means of a Soxhlet extractor, and the polymer was found to contain methyl ethyl ketone-soluble portion in a ratio of 48%.

EXAMPLE 3

Styrene was polymerized in the same manner as in Example 2 except that 4.1 mmol of methylalumoxane (tetramer) in benzene was added and the mixture was stirred for 2 hours before the addition of styrene. Thereby, 0.65 g of polymer was obtained. This polymer was extracted with methyl ethyl ketone for 12 hours by means of a Soxhlet extractor, and the polymer was found to contain a methyl ethyl ketone-soluble portion in an amount as small as 5%.

EXAMPLE 4

Synthesis of Complex: Methylenebis(cyclopentadienyl)titanium-methylalumoxane (16-mer)

97.2 mg (0.372 mmol) of dichloromethylenebis(cyclopentadienyl)titanium was weighed out. Thereto 20 ml of dry toluene was added, and the mixture was cooled to a temperature of −78° C. 2.98 mmol of methylalumoxane (16-mer) in toluene was added thereto dropwise with stirring, and the mixture was allowed to react at 50° C. for 6 hours. Then 20 ml of hexane was added to deposit a reddish brown solid. The solid was collected by filtration, recrystallized from toluene/hexane, and dried. The intended product was obtained in a yield of 71%.

The methane formed by hydrolysis of the resulting complex was determined quantitatively by gas chromatography. The quantity of the methane corresponds to 106% of the calculated quantity by assuming that the structure of the complex is represented by the general formula (1).

EXAMPLE 5

15 mg (0.0129 mmol) of the complex synthesized in Example 4 was weighed out in a nitrogen-purged Schlenk type reactor, and thereto 10 ml of toluene was added. Further thereto 5.0 ml of styrene was added, and the styrene was polymerized at a reaction temperature of 10° C. for 10 hours. After the polymerization reaction, 0.5 ml of methanol was added to stop the reaction. The reaction mixture was put into a mixture of 200 ml of methanol and 2 ml of hydrochloric acid, and stirred sufficiently. The formed white polymer was collected by filtration, and washed twice with 50 ml of methanol. Thus 0.395 g of the polymer was obtained after drying.

This polymer was extracted with methyl ethyl ketone for 12 hours by means of a Soxhlet extractor. The polymer was found to contain no methyl ethyl ketone-soluble portion.

As described above, the catalyst of the present invention is capable of providing an aromatic vinyl polymer having syndiotactic structure with a very high degree of selectivity. Furthermore, the catalyst of the present invention is economically advantageous because the catalyst is sufficiently effective without use of a cocatalyst alumoxane in comparison with the catalyst of the prior art.

Having described the present invention, it will now be apparent to the artisan that many changes and modifications may be made to the above-described embodiments without departing from the spirit and the scope of the present invention.

What is claimed as new and desired to be secured by Letters Patent of the United States is:

1. A catalyst for polymerizing an aromatic vinyl compound, the catalyst having the formula (1):

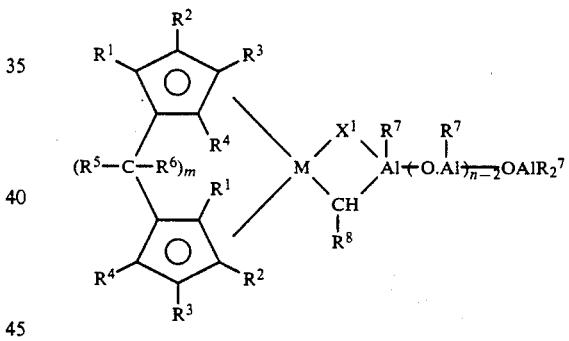

where M is an element of Group IVa; $X^1$ is a halogen; $R^1$, $R^2$, $R^3$, $R^4$, $R^5$, $R^6$ and $R^7$ are independently hydrogen or an alkyl group having 1 to 6 carbon atoms; $R^8$ is hydrogen or an alkyl group having 1 to 5 carbon atoms; m is an integer of from 1 to 6; and n is an integer of from 4 to 60.

2. The catalyst according to claim 1, in which the catalyst is a complex obtained by isolating a reaction product of a compound of a transition metal of Group IVa with an alumoxane.

3. The catalyst according to claim 1, wherein $R^1$ to $R^8$ are each independently hydrogen or methyl.

4. The catalyst according to claim 1, which is methylenebis (cyclopentadienyl)-titanium-methylalumoxane (tetramer) or methylenebis (cyclopentadienyl)-titanium-methylalumoxane (16-mer).

5. A process of preparing a catalyst having the formula (I):

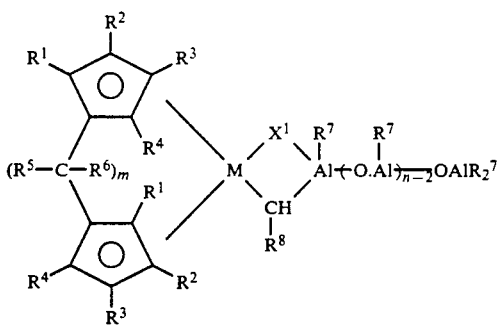

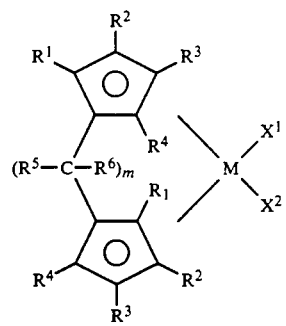

wherein M is an element of Group IV a; $X^1$ is halogen; $R^1$-$R^7$ are each hydrogen or an alkyl group having 1 to 6 carbon atoms; $R^8$ is hydrogen or an alkyl group having 1 to 5 carbon atoms; m is an integer of from 1 to 6; and n is an integer of from 4 to 60; which process comprises:

a) reacting an effective amount of a transition metal compound of the formula (II):

wherein M is an element of Group IVa; $X^1$ and $X^2$ are each halogen; $R^1$-$R^6$ are each hydrogen or an alkyl having from 1 to 6 carbon atoms; and m is an integer of from 1 to 5, with an effective amount of an alumoxane, to form said catalyst; and b) recovering said catalyst.

6. The process according to claim 5, wherein the transition metal compound and said alumoxane are used in the ratio of from about 1 to 10 moles of said transition metal compound per mole of said alumoxane.

* * * * *